March 1, 1960
C. A. DE GIERS
2,926,528
TEMPERATURE COMPENSATED, DENSITY-SENSITIVE
APPARATUS AND SYSTEMS FOR USE THEREOF
Filed Jan. 31, 1957
2 Sheets-Sheet 1
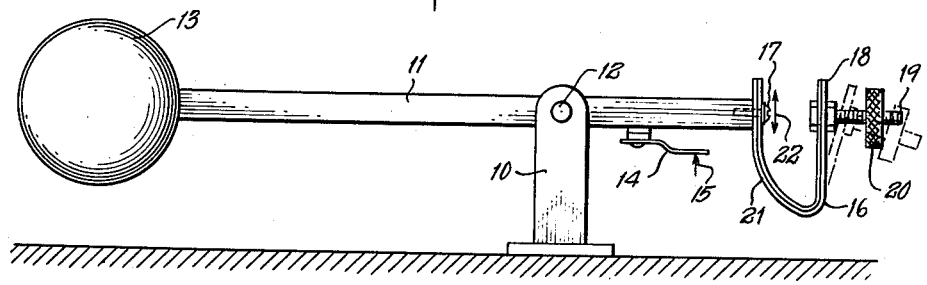
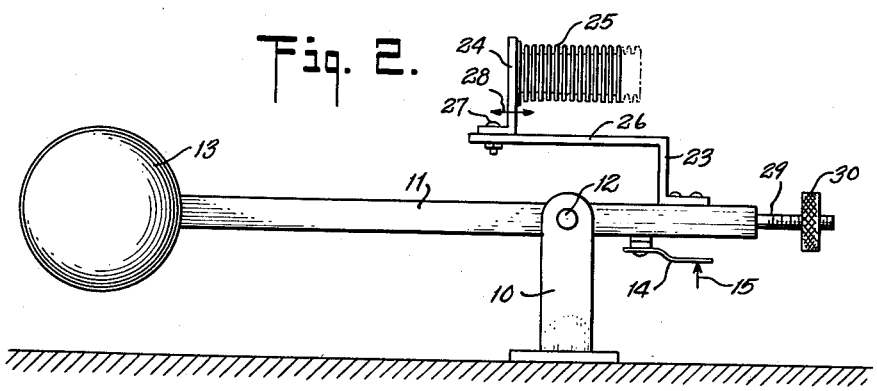
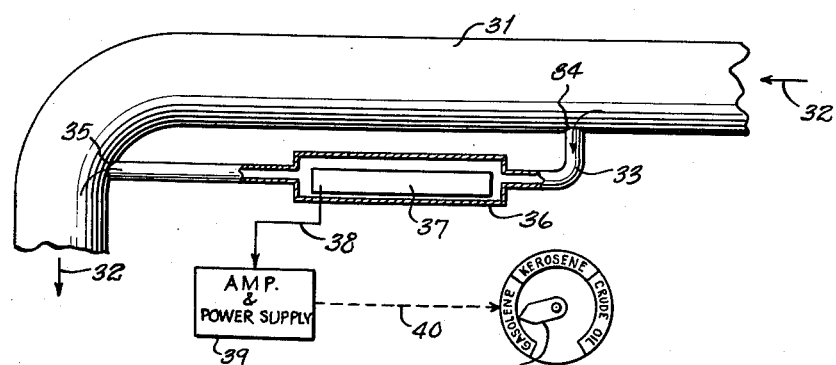
INVENTOR.
Clarence A. deGiers
BY
Paul M. Phillips
ATTORNEY

Fig 4.

United States Patent Office 2,926,528
Patented Mar. 1, 1960

2,926,528

TEMPERATURE COMPENSATED, DENSITY-SENSITIVE APPARATUS AND SYSTEMS FOR USE THEREOF

Clarence A. de Giers, Roslyn, N.Y., assignor to The Liquidometer Corporation, Long Island City, N.Y., a corporation of Delaware Application January 31, 1957, Serial No. 637,541

11 Claims. (Cl. 73—32)

The present invention relates to temperature compensated, density-sensitive apparatus and systems for use thereof and more particularly to apparatus of the general type set forth in my prior United States Reissue Patent Re. 24,075, reissued October 18, 1955, and which is further provided with temperature compensating means and preferably also with suitable calibration means or adjustments, so that the device can sense density or specific gravity of an ambient fluid in which it is wholly immersed with that density or specific gravity corrected to some predetermined temperature. Thus, for example, if the density-sensitive means be used to sense the specific gravity or density of each of a plurality of liquids being transmitted successively through a pipe line, it will be responsive to the densities those liquids would have respectively if their temperatures were all some one given temperature and independent of variations in the densities of any of such liquids occasioned solely by variations in the temperatures thereof respectively from the given temperature aforesaid.

In connection with the operation of pipe lines wherein it may be desired for example, to transmit different fluids, such as gasoline, kerosene and crude oil, at different times, it is necessary at the discharge end of the pipe line to distribute the several fluids transmitted therethrough to different receiving points, dependent upon the type fluids being transmitted. As is well known, petroleum products of the types mentioned expand when heated and consequently have lower densities when heated than when cold. If a device were used, such as that of the reissue application aforesaid, responsive solely to absolute density, it might well be that the distinction between kerosene under relatively high temperature such as are experienced in summer would have a density as low or possibly lower than gasoline at relatively cold temperatures as are experienced in winter. Any apparatus, therefore, which is responsive solely to absolute density and without consideration of temperature leaves considerably to the imagination or to the experience of an operator. The present apparatus, however, which is responsive to the density that a given fluid would have if it were at some particular temperature, such as 60° F., can easily distinguish between the kerosene and gasoline as aforesaid notwithstanding temperature differences and without special manual interposition. As such, the device of the present invention is usable in the automatic control of pipe lines for controlling the distribution of liquid products transmitted therethrough in an automatic manner and without manual interposition.

Summarizing the present invention, therefore, it comprises basically a density-sensitive means including a float carried on an arm pivoted about a horizontal axis and arranged so that a circuit may be made or broken depending upon whether the float is at its "up" or its "down" position, and wherein means are provided for so varying the center of gravity or apparent bulk density of the float and its associated means as to compensate for temperature differences as aforesaid. For this purpose, a temperature-sensitive device is associated with and has one part secured to a part of the arm carrying the float and is so arranged that normal movement of the temperature-sensitive device under the influence of different temperatures will vary the position of the centre of gravity of the device as a whole in a direction to compensate for normal differences in the density of an ambient medium in which the entire device is immersed.

Two different types of temperature-sensitive devices are disclosed herein: (1) a bi-metallic member wherein a weight element is carried by the free or movable end thereof, and (2) an expansible bellows so mounted that expansion or contraction thereof will cause a change in the position of the center of gravity of the associated float and its supporting means.

In connection with both the above mentioned temperature-sensitive devices, at least one and preferably two types of calibrating adjustments are provided, including: (1) a variable connection between the temperature-sensitive element and the supporting means or arm by which the float is carried, and (2) an adjustment of a weight element toward and away from the axis about which the float is pivoted. By one or both these means, the float element may be accurately calibrated to compensate for the expansion of the type of liquids in which it is to be immersed, or more particularly for the coefficient of thermal expansion thereof.

The present invention also includes systems employing density-sensitive means as aforesaid, either for merely indicating a value indicative of the density being measured to permit manual action and possibly also for recording or for effecting an automatic control such, for example, as a control of a plurality of valves which in turn serve to distribute fluids flowing through a pipe line into several different receiving points based upon the different densities of the fluids respectively. A system is also contemplated for both purposes aforesaid.

Other and more detailed objects and advantages of the present invention will become apparent from a consideration of the following particular description of certain preferred embodiments thereof and will be pointed out in the appended claims, all when considered in connection with the accompanying drawings in which:

Fig. 1 is a more or less diagrammatic view, substantially in elevation, showing a single density-responsive element having a bimetallic temperature-responsive element associated therewith and arranged for making and breaking an electric circuit, and wherein a position assumed by certain of the parts at a different and higher temperature is indicated in dotted lines;

Fig. 2 is a view similar to Fig. 1, showing another embodiment of the invention, wherein the temperature-responsive element is in the form of an expansible bellows;

Figure 4:
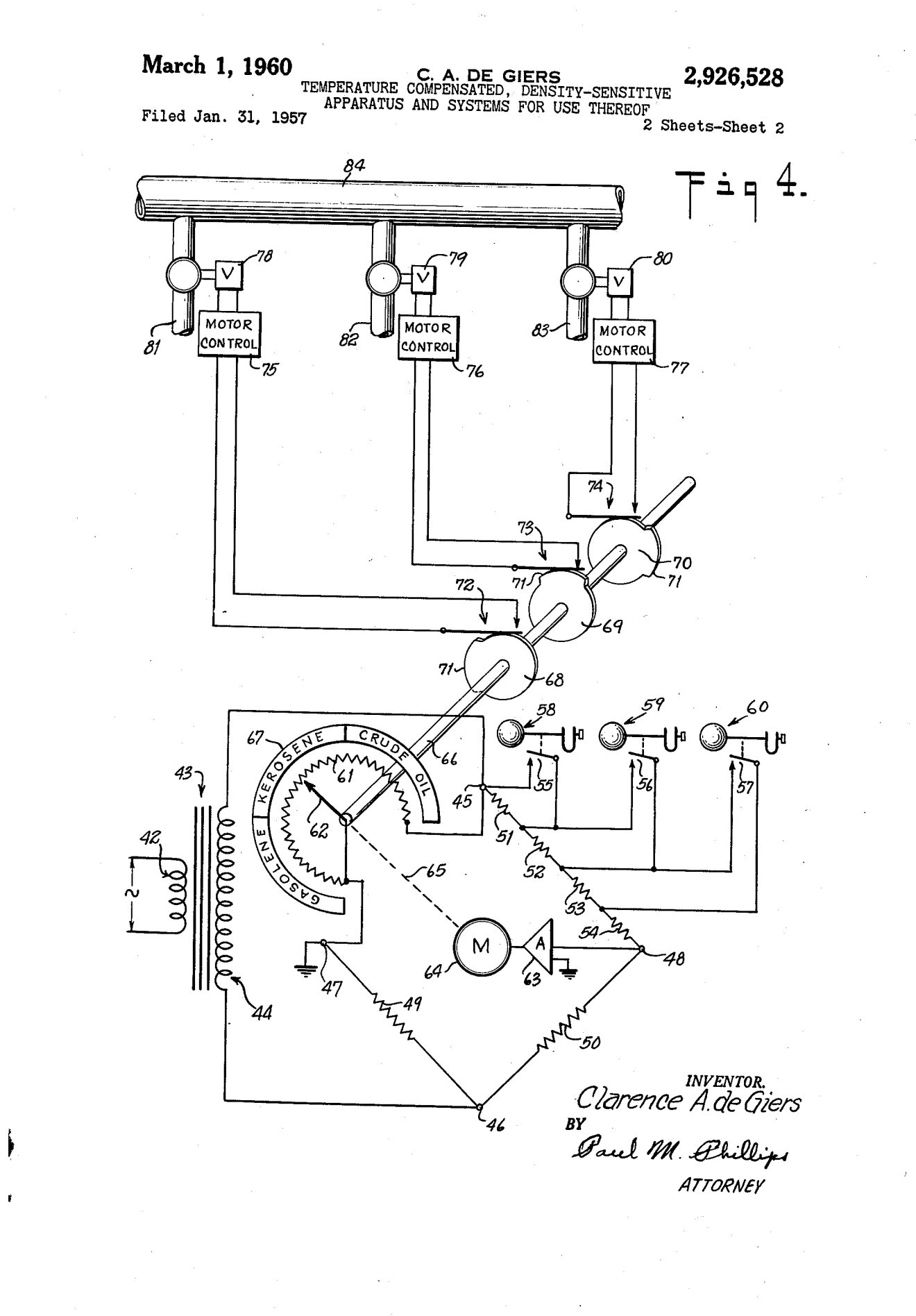

Fig. 3 is a diagrammatic view with some parts in section of a portion of a pipe line, with which is associated a bypass passage including a density-sensitive means according to the present invention, this means and the indicator actuated thereby being shown diagrammatically; and Fig. 4 is a diagram including a plurality of the type of density-sensitive means shown in greater detail in Fig. 1 associated with a self-balancing bridge network, which in turn is arranged to operate a control system for controlling distribution of fluids being transmitted through a pipe line, so as to divert such fluids to different receiving points in accordance with the density thereof respectively.

Considering first the form of the invention shown in Fig. 1 of the accompanying drawings, there is illustrated in a diagrammatic manner a standard 10, on which is pivoted an arm 11 for movement about a substantially horizontal axis indicated at 12. The arm 11 carries on one end a float 13.

It will be understood that in a complete density-sensitive apparatus or system, a considerable number of devices, each similar to that shown in Fig. 1, will be provided with the float elements thereof progressively differently weighted to be responsive to different bulk densities within the range of densities to be sensed. This is particularly taught in the reissue patent aforesaid, which shows in Figs. 5, 6 and 7 thereof an embodiment of the invention which closely resembles a commercial embodiment now being produced. It will be understood that each of the float elements as shown in Fig. 1 is arranged to make and break an electrical circuit, for example, in the manner particularly disclosed in the reissue patent aforesaid and which is shown in its diagrammatic equivalent by a pair of contacts 14 and 15, contact 14 being shown as carried by the arm 11 and the contact 15 being stationary in the diagrammatic showing of Fig. 1.

Thus, considering the arrangement shown in Fig. 1, the parts are shown in the position in which the float 13 is at the uppermost end of its path of movement or its "up" position. At this position the contacts 14 and 15 are in engagement with one another so as to complete an electric circuit therethrough. If, however, the float 13 be moved, for example, by the medium in which it is immersed having a somewhat lower bulk density than that of the float, causing the float to move to its "down" position, then the arm 11 will move counterclockwise about the axis 12 as seen in Fig. 1, causing the electrical contacts 14 and 15 to be separated, and in a practical embodiment of the invention, changing the impedance of an electric circuit by an increment corresponding to each float device respectively. This operation is explained in considerable detail in the reissue patent aforesaid and is also shown and hereinafter described in connection with Fig. 4 of the present drawings.

There is further associated with the float and its mounting means (the arm 11 in the present case) a temperature-sensitive means, which in the embodiment of the invention shown in Fig. 1 is a substantially U-shaped bimetallic element 16, this element being mounted so that one portion thereof (i.e. one leg of the U) is secured to the arm 11 by a suitable means such as a screw 17. The other and relatively movable portion of the temperature-sensitive means (i.e. the other leg of the U) is shown at 18 and is provided with a threaded stud 19 on which is a nut 20 constituting a weight element. Thus, when the temperature-sensitive means 16 is subjected to an increased temperature, for example, it can move from the full line to the dotted line positions in Fig. 1, resulting in moving the nut or weight element 20 further from the axis 12 and in effect resulting in shifting the center of gravity of the entire float and its supporting means in a direction toward the right as seen in Fig. 1. Thus, the float will have a relatively less apparent or bulk density. This will tend at least to minimize and preferably exactly to compensate for the tendency of the float to move upward due to the ambient medium being subject to a correspondingly increased temperature so as to give it a lower absolute density. If the compensation is exact, as is desired, then the float will move from one of its positions to the other when surrounded by a given ambient medium having some one predetermined density at a given temperature for example, 60° F. even though it is actually immersed in the same medium heated or cooled so that the actual temperature thereof and the resulting absolute density are both substantially different from these values at the one given temperature which is used as a standard in calibrating the device.

Calibrating means are provided in this device and included as a variable connection between the bimetallic element 16 and the float arm 11. For this purpose the bimetallic element is preferably provided with a vertically elongated slot (not shown) in the somewhat arcuate shaped leg 21 thereof, so that the screw 17 may be loosened and the bimetallic element 16 adjusted with respect to the arm 11 as shown by double ended arrow 22. This will control the amount which the bimetallic element moves the weight element 20 for a given change in temperature. In general, the closer the point of connection between the bimetallic element 16 and the arm 11 to the bight of the U, the smaller will be the movement of the weight element 20 for any given temperature change.

There is further provided an additional calibrating adjustment, namely that the weight element 20 may be threaded along the stud 19 to the right or left as seen in Fig. 1 so as to shift the center of gravity accordingly.

The combination of these two calibrating adjustments has been found to be sufficient so that the device as a whole may be adjusted in accordance with the coefficients of thermal expansion of different fluids in which it may be immersed, so as substantially to compensate for temperature changes and so that, when a plurality of devices as generally incidated in Fig. 1 are used, the density-sensitive means, considered as a whole, will be responsive to the densities which the ambient media would have respectively if their densities were all corrected to some one given temperature.

In the form of the invention shown in Fig. 2, certain parts which have the same functions and arrangements are given the same reference numbers. In this form, however, there is a different type of temperature-sensitive means. As shown, a Z-shaped bracket 23 is secured to the arm 11 and extends above the pivot axis 12. To this bracket is adjustably secured a bracket 24 carrying the left hand end as shown of a closed ended bellows 25. The bellows 25 is preferably filled with a fluid, and particularly a liquid having a coefficient of thermal expansion which is preferably quite high, so as to cause a substantial difference in the position of the free end portion (the right end as seen in Fig. 2) of the bellows 25 upon temperature difference as shown, for example by a comparison of the full and dotted line showings of the bellows in the drawings. It is contemplated for example, that some liquid as kerosene could be used for filling the bellows.

It will be seen that when the bellows is moved by an increased temperature from the full to the dotted line positions in Fig. 2, the center of gravity of the bellows and hence the center of gravity of the entire float arrangement will be moved from left to right in a manner similar to the movement of the center of gravity of the form shown in Fig. 1 upon an increase in temperature. The purpose here is the same as has been explained in detail as to Fig. 1.

In this case also there is provided a calibrating means, particularly a variable position connection between the fixed end of the temperature-sensitive means and a part rigid with the arm 11 and float 13. For this purpose the upper, substantially horizontal leg 26 of the bracket 23 is preferably slotted in a direction parallel to the arm 11, so that the nut and bolt connection at 27 between this leg 26 and the bracket 24 may be adjustably varied in a direction parallel to the arm 11 as indicated by the double ended arrow 28. The purpose of this calibrating adjustment is substantially the same as that indicated at 22 and explained above in connection with Fig. 1.

In addition, in the form of Fig. 2, the right hand end of the arm 11 as seen in this figure is provided with a threaded stud 29 on which is screwed a member 30 constituting a weight element and having the same function as the member 20 threaded on the stud 19. Again, the combination of these two calibrating adjustments is effective to give the same type calibration and for the same purpose as described above in detail in connection with Fig. 1.

Referring now to Fig. 3 of the drawings, there is shown one adaptation of a system embodying the present invention for continuously indicating the density of fluid flowing through a pipe line. In the drawings, a portion of a pipe line is shown at 31, fluid flowing through the pipe line as indicated by arrows 32. There is provided a by-pass passage 33 connected to the pipe line at 34 and 35 at spaced points therealong and having an enlarged portion 36 in which is disposed a density-sensitive means 37. This means 37 may comprise a plurality of devices, each as shown, for example in Fig. 1 or 2, and collectively constituting an apparatus similar to that indicated in Fig. 7 of the reissue patent aforesaid. The several individual density-sensitive elements, each as shown in Fig. 1 or Fig. 2, are arranged with their floats having graduated bulk or apparent densities throughout the range of densities to be measured and/or recorded. These several density-sensitive elements are then respectively arranged as taught in the reissue patent aforesaid to control corresponding increments of impedance in an electric circuit. These increments of impedance may be resistive or reactive; and if the latter, may be either inductive or capacitive. Inasmuch as all these types of impedance have been generally disclosed as equivalents of one another in the reissue patent aforesaid and as systems for sensing the total impedance in a circuit are also well known, the particular circuit is not shown in Fig. 3, but in lieu thereof there is diagrammatically illustrated a connection 38 which may include a plurality of conductors leading to a block 39 bearing the designation, "Amp. and Power Supply," which is intended to mean that this block includes a conventional supply means for electric power and a conventional amplifier as necessary, and usually also a servo-motor arranged automatically to control the position of an indicator through a means (as a mechanical gear train) diagrammatically illustrated as a broken line 40, the indicator being shown at 41 and being arranged to designate the material passing through the pipe line 31 as "Gasoline," "Kerosene" and "Crude Oil" or some other equivalent and appropriate designations. The detailed arrangement of how such devices may operate is set out more fully in connection with Fig. 4 presently to be described.

In Fig. 4 there is shown a primary winding 42 of a transformer 43, which is energized from a suitable source of alternating current. The secondary winding 44 of this transformer is connected to opposite current input points 45 and 46 of a bridge network. The bridge network includes output points 47 and 48, one of which (point 47) may be grounded if desired. The point 47 could, if desired, be connected to a midpoint of the transformer secondary 44 or to such midpoint and also to ground. The lower left and lower right arms of the bridge (as shown in Fig. 4) between the input point 46 and the output points 47 and 48 respectively are constituted as shown by fixed resistances (or other similar impedances) 49 and 50. The upper right leg of the bridge (as shown) between the input 45 and the output point 48 is made up of a plurality of incremental resistances 51, 52, 53, and 54 as shown. Each of the resistances 51, 52 and 53 is arranged to be shorted out by a float-controlled switch as indicated at 55, 56 and 57 controlled respectively by float devices generally indicated at 58, 59 and 60 respectively. As shown in the diagram (Fig. 4), each of the devices 58, 59 and 60 may be of the type shown in Fig. 1 and described in detail; and each switch 55, 56 and 57 may be, for example, equivalent to that shown in Fig. 1 at 14—15. It will be understood, of course, that there may be many more than three float devices as shown in Fig. 4; and in fact up to twenty or thirty such devices in a single installation is positively contemplated, there being an increment of impedance, in this case of resistance, corresponding to and arranged to be controlled by each float-operated device, so that the overall impedance of the bridge arm between the input point 45 and output point 48 will be a predetermined function of the density of the ambient fluid as sensed by the several float devices. Inasmuch as each of these float devices has associated therewith a temperature-responsive means as particularly described in connection with Fig. 1, it will be seen that the overall impedance of this arm of the bridge will be a function of the density of the ambient medium, with due compensation or correction for the existing temperature of that medium, or in other words, a function of the value which the density of such medium would have if the temperature of the medium were some predetermined value.

The fourth arm of the bridge shown at the upper left in Fig. 4 between the input point 45 and the output point 47 is here constituted by a variable resistance, presented as an example of a variable impedance including a resistance element 61 connected between the points 45 and 47 of the bridge and a slide member 62 connected to the output point 47 and arranged to short out a variable portion of the resistance 61. It will be seen that when the slide member 62 is suitably adjusted, the bridge may be balanced for any value of density as translated into a predetermined member of the resistances 51 to 53 shorted out.

While balancing of the bridge could, of course, be done manually, it is contemplated that any suitable automatic bridge balancing devices should be used, such as one including an amplifier 63 connected to the output terminals of the bridge as shown and arranged to control the operation of a reversible electric motor 64. The motor may then be mechanically connected through a suitable gear train indicated by the broken line 65 to a shaft 66 carrying the slider 62. The arrangement is such that when the bridge is unbalanced, the unbalance output of the bridge will be amplified to cause the motor 64 to operate in a direction such as to rotate the shaft 66 to move the slider 62 until the bridge is again in balance and the electrical output thereof is reduced substantially to zero, at which time the motor 64 ceases to operate.

The slider 62 may either itself serve as an indicator pointer and cooperate with suitable indicia as indicated at 67 or, if desired, the shaft 66 may be directly or indirectly connected to operate a suitable indicator, so as to give a visual indication of the density being sensed as generally described in connection with Fig. 3.

The device may also be arranged as shown in Fig. 4 to effect an automatic control. For this purpose the shaft 66 may be provided with one or more cams as shown at 68, 69 and 70 having lobes as indicated, for example, at 71 thereon corresponding in angular extent to the angular extent of a zone in the density scale, in which zone all fluids are to be considered as a single type. Each cam may then have associated therewith a switch as shown at 72, 73 and 74, which in turn may operate through suitable motor controlled means or other electrical actuating means indicated respectively at 75, 76 and 77, to control the operation of suitable valves 78, 79 and 80, which in turn control the flow of fluids through branch lines 81, 82 and 83 respectively from a pipe line 84 and thus control the distribution of fluids from the pipe line to a plurality of distribution points to which the different fluids flowing from time to time in the pipe line may be distributed in accordance with the density thereof. Thus, for example, in the position of the valves shown, kerosene is being supplied through the pipe line, so that cam 69 is in a position to close its associated switch 73; and this switch, operating through motor control means 76, is effective to maintain valve 79 open, while valves 78 and 80 remain closed, so as to divert all the flow from the pipe line 84 through the branch pipe 82.

It will be understood that as many cams as desired may be used on the shaft 66, so as to control the distribution of fluids into as many different distribution points as may be desired in a particular installation.

While there is herein shown and described but two principal embodiments of the density-sensitive means with different types of temperature correction means associated therewith and but a few of the systems in which such devices can be used have been particularly described, many other equivalents of the apparatus specifically described will suggest themselves to those skilled in the art from the foregoing description. I do not, however, wish to be limited, therefore, except by the scope of the appended claims, which are to be construed validly as broadly as the state of the prior art permits.

What is claimed is:

1. Density-sensitive means, comprising a float having a predetermined bulk density, means mounting said float for pivotal movement about a substantially horizontal axis; and a temperature-sensitive means having one portion fixedly carried by said mounting means, and having another portion: (a) which is movable with respect to said one portion in response to the ambient temperature, (b) which is also movable with respect to said mounting means upon temperature change, and (c) which is effective to vary the position of the center of gravity of said mounting means and parts carried thereby in response to temperature changes; said temperature-sensitive means being so mounted on said mounting means that upon a change in the ambient temperature, it will shift the center of gravity of said mounting means in a direction tending to compensate for the density change in a fluid medium in which the entire density-sensitive means is immersed, so as to reduce the effect upon the density-sensitive means of a change in the density of said medium due solely to a change in the temperature thereof; and calibrating means for assuring a predetermined desired temperature correction of the center of gravity of said mounting means, comprising means for adjustably varying the relative positions of said one portion which is fixedly carried by said mounting means with respect to said mounting means.

2. Density-sensitive means, comprising an arm pivoted on a substantially horizontal axis, a float mounted on one end of said arm for moving it about said axis when said float is influenced by an ambient medium having a density above or below the bulk density of said float, a U-shaped bimetallic element having one leg of the U connected to an end of said arm opposite that to which said float is secured and a weight member secured to the other leg of said U, so as to be moved by a change in shape of said bimetallic element in accordance with the temperature to which said bimetallic element is subjected, and means responsive to the angular position of said arm about said axis for making and breaking an electric circuit.

3. Density-sensitive means, comprising a float having a predetermined bulk density, means mounting said float for pivotal movement about a substantially horizontal axis; and a temperature-sensitive bimetallic element having one portion fixedly carried by said mounting means and another portion which is spaced from said one portion and which carries a weight element so that said weight element is movable with respect to said one portion and with respect to said mounting means upon a temperature change affecting the shape of said bimetallic element and is effective to vary the center of gravity of said mounting means in response to changes in the ambient temperature, said bimetallic element being so constructed and arranged that when the entire density-sensitive means is immersed in a fluid medium, a change in the temperature of the fluid medium and a consequent change in the density thereof will be at least in part balanced by a change in the position of the center of gravity of said mounting means effective to change the density at which said float will move about said axis; further comprising means for adjustably varying the point at which said bimetallic element is connected to said mounting means, so that this point of connection may be adjustably varied for calibrating the apparatus as a whole, so that the position of said float and of said mounting means will be substantially unaffected by a density change in an ambient fluid medium caused solely by temperature changes of said medium.

4. Density-sensitive means in accordance with claim 2, further comprising means for adjustably varying the point on the first-named leg of said bimetallic element which is connected to said arm, so as to provide a calibrating adjustment to enable the density-sensitive means to be substantially unaffected in its position by density changes of an ambient fluid medium caused solely by temperature changes of such medium.

5. Density-sensitive means in accordance with claim 2, further comprising means for adjustably varying the point on the first-named leg of said bimetallic element which is connected to said arm, means for mounting a weight element onto the other leg of said U-shaped bimetallic element, and means for adjustably varying the distance between said weight element and its point of connection to said bimetallic element, so as to provide calibrating adjustments to enable the density-sensitive means to be substantially unaffected in its position by density changes of an ambient fluid medium caused solely by temperature changes of such medium.

6. Density-sensitive means, comprising an arm pivoted on a substantially horizontal axis, a float mounted on one end of said arm for moving it about said axis when said float is influenced by an ambient medium having a density above or below the bulk density of said float, a closed-ended, fluid-filled, expansible bellows mounted on said arm so that the expansion thereof shall be in a direction parallel to said arm, and means securing one end of said bellows to said arm with the other end of said bellows more remote from said float than the end thereof which is secured to said arm, whereby expansion of said bellows in response to variations in the ambient temperature will move the center of gravity of said arm and all the means carried thereby in a direction tending at least in part to balance the effect upon the density-sensitive means of a change in the density of said ambient medium due solely to a change in the temperature of such medium.

7. Density-sensitive means in accordance with claim 6, further comprising adjustable calibrating means including means for adjustably varying the point of connection between said one end of said bellows and said arm in a direction longitudinal of said arm.

8. Density-sensitive means in accordance with claim 7, in which said adjustable calibrating means further comprises a weight element carried by said arm, and means for adjustably varying the distance between said weight element and said axis, said adjustable calibrating means collectively providing for the adjustment of said density-sensitive means, so that the position thereof will be substantially unaffected by density changes in an ambient fluid medium caused solely by temperature changes of said medium.

9. In a system responsive to the densities of different fluids flowing successively through a pipe-line, a by-pass passage connected to said pipe line at spaced points therealong, density-sensitive means disposed in said by-pass passage and arranged to be completely immersed in the fluid flowing therethrough, said density-sensitive means comprising a plurality of floats of predetermined different bulk densities graduated throughout the range of densities of the fluids to be sensed which flow through said pipeline, all of said floats being arranged so as always to be completely immersed in said fluid, and each float being constrained to a limited up-and-down movement according as it is lighter or heavier than the fluid displaced thereby, an electrical circuit including elements providing a plurality of increments of impedance corresponding to the number of said floats, each impedance increment being constructed and arranged to be varied by the "up" or "down" positions of said floats respectively, an impedance-responsive means connected to said circuit so as to be controlled by the total impedance thereof as affected by the positions of said floats respectively, and a member positioned by said impedance-responsive means, and temperature-responsive means carried by and movable with each of said floats respectively and constructed and arranged to vary the effective bulk density of each of said floats in a direction such as to reduce the effect upon the density-sensitive means of a change in the density of the fluid in which each float is immersed due solely to a change in the temperature of said fluid, so that the density-sensitive means considered as a whole shall be responsive substantially to the densities which the successive fluids in which it is immersed from time to time would have if such densities were corrected substantially to a given temperature, so as to minimize the effect of varying temperatures of the fluids flowing through the pipe-line on the density-sensitive means associated therewith as aforesaid, and so that said member which is positioned by said impedance-responsive means will be caused to assume a position which is a direct function of the density of said fluid at said given temperature.

10. A system in accordance with claim 9, in which said impedance-responsive means comprises an indicator arranged to be controlled in its position in accordance with the number of floats at their "up" positions with respect to the total number of floats, so as to give an indication which is accurately representative of the density at a given temperature of the fluid flowing through the pipe-line at any time.

11. A system in accordance with claim 10, further comprising a self-balancing bridge circuit, in one arm of which is located all the elements providing said impedance increments which are controlled by said floats, an impedance of the same kind in a second arm of said bridge arranged to be varied so as to balance the bridge, and means responsive to the balance value of the bridge balancing impedance for indicating a value which is accurately representative of the density at a given temperature of the fluids being sensed from time to time.

References Cited in the file of this patent

UNITED STATES PATENTS

| | | |
|---|---|---|
| 1,689,659 | Albersheim | Oct. 30, 1928 |
| 2,053,353 | Talbot | Sept. 8, 1936 |
| 2,334,242 | Bohannan | Nov. 16, 1943 |
| 2,691,296 | De Giers | Oct. 12, 1954 |
| 2,717,078 | Levi | Sept. 6, 1955 |
| 2,767,580 | Bevins et al. | Oct. 23, 1956 |
| 2,859,757 | Parsons | Nov. 11, 1958 |

FOREIGN PATENTS

| | | |
|---|---|---|
| 80,717 | Germany | Apr. 18, 1895 |